(12) United States Patent
Fadell et al.

(10) Patent No.: US 10,089,842 B2
(45) Date of Patent: Oct. 2, 2018

(54) SMART-HOME SECURITY SYSTEM WITH KEYPAD DEVICE RESISTANT TO ANOMALOUS TREATMENT

(71) Applicant: Google LLC, Mountain View, CA (US)

(72) Inventors: Anthony Michael Fadell, Portola Valley, CA (US); Matthew Lee Rogers, Los Gatos, CA (US); Maxime Veron, San Jose, CA (US); David Sloo, Menlo Park, CA (US); Sophie Le Guen, Burlingame, CA (US); Kevin Peterson, San Francisco, CA (US); Yoky Matsuoka, Palo Alto, CA (US); Shigefumi Honjo, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 813 days.

(21) Appl. No.: 14/508,183

(22) Filed: Oct. 7, 2014

(65) Prior Publication Data

US 2015/0097958 A1 Apr. 9, 2015

Related U.S. Application Data

(60) Provisional application No. 61/887,963, filed on Oct. 7, 2013.

(51) Int. Cl.
*H04N 7/18* (2006.01)
*G08B 13/06* (2006.01)
(Continued)

(52) U.S. Cl.
CPC ............ *G08B 13/06* (2013.01); *G05B 15/02* (2013.01); *G05F 1/66* (2013.01); *G08B 29/04* (2013.01);
(Continued)

(58) Field of Classification Search
CPC ................ G08B 13/06; G08B 29/04
(Continued)

(56) References Cited

U.S. PATENT DOCUMENTS 4,254,414 A 3/1981 Street et al.
4,313,110 A 1/1982 Subulak et al.
(Continued)

OTHER PUBLICATIONS

Notice of Publication dated Jul. 20, 2016, for European Patent Application No. 14852527.2.
(Continued)

*Primary Examiner* — Jeremaiah C Hallenbeck-Huber
(74) *Attorney, Agent, or Firm* — Kilpatrick Townsend & Stockton LLP (57) ABSTRACT

Security keypad device for detecting tampering includes a keypad, a high power wireless module for communicating data via a local area network, a low power wireless module communicating data via a personal area network, and a cellular module for communicating data via a wide area network. The device further includes an active infrared position sensor comprising of a light source for emitting infrared light and an infrared sensor for detecting reflected infrared light. The active infrared position sensor is configured to sense the position of the device based on detecting the reflected infrared light. The device further includes an accelerometer configured to measure acceleration forces and a processor. The processor is configured to determine that the position of the device changed based on positional data from the active infrared position sensor or acceleration data from the accelerometer.

20 Claims, 7 Drawing Sheets (51) Int. Cl.
  *G08B 29/04* (2006.01)
  *G05B 15/02* (2006.01)
  *G05F 1/66* (2006.01)
  *H04L 12/28* (2006.01)
  *H04N 21/422* (2011.01)
  *H04N 21/4227* (2011.01)
  *H04N 21/436* (2011.01)

(52) U.S. Cl.
  CPC ...... *H04L 12/2803* (2013.01); *H04L 12/2825* (2013.01); *H04N 21/4227* (2013.01); *H04N 21/42202* (2013.01); *H04N 21/42221* (2013.01); *H04N 21/43615* (2013.01); *G05B 2219/2642* (2013.01); *H04L 2012/2841* (2013.01)

(58) Field of Classification Search
  USPC .......................................................... 348/152
  See application file for complete search history.

(56) References Cited

U.S. PATENT DOCUMENTS

| | | | |
|---|---|---|---|
| 4,390,869 A | 6/1983 | Christen et al. | |
| 6,122,163 A * | 9/2000 | Stone | G06F 1/1616 361/679.31 |
| 6,127,926 A * | 10/2000 | Dando | G08B 13/2491 340/522 |
| 2005/0195972 A1 * | 9/2005 | Barr | G06F 1/1601 379/435 |
| 2006/0055534 A1 * | 3/2006 | Fergusson | G01D 5/2405 340/562 |
| 2006/0187024 A1 * | 8/2006 | Azimi | G08B 13/181 340/539.1 |
| 2007/0063841 A1 * | 3/2007 | Babich | G08B 13/191 340/545.1 |
| 2007/0255522 A1 | 11/2007 | Gordon et al. | |
| 2008/0092230 A1 * | 4/2008 | Addy | G07C 9/00817 726/19 |
| 2008/0191860 A1 * | 8/2008 | Flook | G06T 7/001 340/506 |
| 2009/0016308 A1 * | 1/2009 | Twitchell, Jr. | H01Q 1/2208 370/338 |
| 2009/0066652 A1 * | 3/2009 | Verstraelen | G08B 13/1427 345/168 |
| 2009/0167488 A1 * | 7/2009 | Hays | G07C 9/00309 340/5.5 |
| 2010/0033329 A1 * | 2/2010 | Davis | G08B 13/1436 340/571 |
| 2010/0195810 A1 | 8/2010 | Mota et al. | |
| 2010/0265069 A1 * | 10/2010 | Michaels | G08B 13/08 340/572.3 |
| 2010/0325074 A1 | 12/2010 | Ng et al. | |
| 2011/0121967 A1 * | 5/2011 | Benjelloun | G08B 13/149 340/540 |
| 2011/0302078 A1 * | 12/2011 | Failing | B60L 3/00 705/39 |
| 2012/0126975 A1 | 5/2012 | Gonzales | |
| 2012/0286951 A1 * | 11/2012 | Hess | G08B 25/008 340/539.1 |
| 2013/0015974 A1 * | 1/2013 | Lasker | G08B 13/08 340/547 |
| 2013/0207802 A1 * | 8/2013 | Wu | G08B 25/001 340/528 |
| 2013/0321150 A1 * | 12/2013 | Koenig | G08B 25/008 340/541 |
| 2014/0085093 A1 | 3/2014 | Mittleman et al. | |
| 2014/0266669 A1 * | 9/2014 | Fadell | G05B 19/042 340/501 |

OTHER PUBLICATIONS

Notice of Allowance and Fee(s) due dated Jul. 21, 2016, for U.S. Appl. No. 14/878,884, 9 pages.
Supplemental Notice of Allowability dated Aug. 3, 2016, for U.S. Appl. No. 14/878,884, 2 pages.
Notice of Publication dated Aug. 24, 2016 for Chinese Patent Application No. 201480065558.6.
International Office Action dated Dec. 24, 2014 for International Patent Application PCT/US2014/059538 filed on Oct. 7, 2014, all pages.
ISR/WO dated Feb. 26, 2015 for International Patent Application PCT/US2014/059538 filed on Oct. 7, 2014, all pages.

* cited by examiner

SMART-HOME SECURITY SYSTEM WITH KEYPAD DEVICE RESISTANT TO ANOMALOUS TREATMENT

CROSS-REFERENCES TO RELATED APPLICATIONS

This application claims the benefit of U.S. Provisional Patent Application No. 61/887,963, filed Oct. 7, 2013, the entire disclosure of which is hereby incorporated by reference for all purposes.

BACKGROUND

1. The Field of the Invention

The present invention generally relates to security system keypads. More specifically, the present invention relates to physical tampering detection for a security keypad.

2. The Relevant Technology

The keypad is an integral component of home security systems. The keypad functions as a user interface for a security system, providing controls for the operation of the security system and displaying output information from the security system. For example, a user can use the keypad to activate the security system when leaving home and to disable the system when the user returns. Keypads also include a display screen or indicator lights for communicating information to the user, such as the state of the security system.

The keypad is connected to a control panel, which is also connected to the sensors of the system. The control panel performs the central processing functions for the security system. Readings from the sensors and user input received by the keypad are transmitted to the control panel for processing. When an intrusion is detected by the sensors, the control panel triggers the alarm response, which can include activating an audible alarm and transmitting a notification to authorities or users.

BRIEF SUMMARY

In one embodiment, a system for detecting tampering of a security keypad device is presented. The system includes the security keypad device and a computer server system. The computer server system is communicatively coupled to the security keypad device.

The security keypad device includes a keypad, a high power wireless module, a low power wireless module, and a cellular module. The high power wireless module is configured to transmit and receive data wirelessly via a local area network. The low power wireless module, while often transmitting and receiving data wirelessly via a personal area network at a lower rate of data transfer than the high power wireless module, nevertheless generally consumes less power than the high power wireless module. The cellular module is configured to transmit and receive data wirelessly via a wide area network.

The security keypad device further includes a power cord configured to transfer power to the security keypad device from a primary power source, a battery compartment configured to hold a secondary power source, an active infrared (IR) position sensor and an accelerometer. The active IR position sensor comprises a light source configured to emit IR light and an IR sensor configured to detect reflected IR light. The active IR position sensor is configured to sense the position of the security keypad device based on detecting the reflected IR light. The accelerometer is configured to measure an acceleration force.

The security keypad device further includes a processor configured to receive positional data from the active IR position sensor and acceleration data from the accelerometer. The processor determines that the position of the security keypad device changed based on the positional data or the acceleration data and transmits a tampering event to the computer server system in response to determining that the position of the security keypad device changed. The tampering event indicates that the security keypad device has been physically tampered with.

The computer server system is configured to receive the tampering event and transmit the tampering event to a mobile device that is authorized to access the account associated with the security keypad device.

In another embodiment, a security keypad device for detecting tampering is presented. The security keypad device includes a keypad, a high power wireless module, a low power wireless module, and a cellular module. The low power wireless module, while often transmitting and receiving data wirelessly via a personal area network at a lower rate of data transfer than the high power wireless module, nevertheless generally consumes less power than the high power wireless module. The cellular module is configured to transmit and receive data wirelessly via a wide area network.

The security keypad device further includes a horn, an active IR position sensor, an accelerometer, and a processor. The horn is configured to generate an audible alarm. The active IR position sensor comprises a light source configured to emit IR light and an IR sensor configured to detect reflected IR light. The active IR position sensor is configured to sense the position of the security keypad device based on detecting the reflected IR light. The accelerometer is configured to measure an acceleration force. The processor is configured to receive positional data from the active IR position sensor and acceleration data from the accelerometer. The processor determines that the position of the security keypad device changed based on the positional data or the acceleration data, determines whether the degree of change is sufficient to constitute an anomalous condition such as a tampering attempt, and activates the horn in response to determining the presence of the anomalous condition. Alternatively or in conjunction with activating the horn, the security keypad device may notify, via one or more of the cellular, high power wireless, and low power wireless communication modules, an external computing system (e.g., a remote cloud server) and/or a user's mobile device that an anomalous condition such as tampering has been detected.

In a further embodiment, a security keypad device for detecting tampering is presented. The security keypad device includes means for receiving user input of a code, means for communicating data wirelessly via a local area network at a relatively high rate of data transfer that consumes a relatively high amount of power, means for communicating data wirelessly via a personal area network at a relatively low rate of data transfer that consumes a relatively low amount of power, and means for communicating data wirelessly via a wide area network.

The security keypad device further includes means for emitting infrared (IR) light, means for detecting reflected IR light, means for sensing a position of the security keypad device based on detecting the reflected IR light, and means for measuring an acceleration force on the security keypad device. The security keypad device also includes means for determining that the position of the security keypad device changed based on at least one of the sensed position and the measured acceleration force, and means for generating an audible alarm in response to determining that the position of the security keypad device changed.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Security systems use a variety of different sensors to detect intruders for a home or enclosure. However, sensors are unable to discern the difference between an intruder and an occupant. To reduce false alarms that are triggered by the occupant, security systems provide a countdown when an intrusion is detected. The alarm will be triggered when the countdown reaches zero and the occupant must enter a code into the keypad before that happens to avoid a false alarm. Once the code is entered, the security system switches to a quiescent state so that the alarm will not be triggered by the occupant while the occupant is home.

The keypad is typically located close to an entrance of the home and provides an indication of the countdown once an intrusion is detected. When an intruder enters the home and sees the keypad, often times the intruder will try to "smash and bash" the keypad to prevent the system from triggering the alarm. In some security systems, the control panel is integrated into the keypad. The intruder can effectively disable these systems if the keypad is destroyed before the countdown reaches zero.

The embodiments of the invention described herein below address such issues by providing devices and systems for detecting physical tampering. In one embodiment, a security keypad device includes an active infrared (AIR) position sensor and an accelerometer. The AIR position sensor includes a light source that emits infrared light and an infrared sensor that detects reflected infrared light. The position of the security keypad device is determined based on the reflected infrared light that is detected. The accelerometer measures acceleration forces on the security keypad device. When the AIR position sensor or the accelerometer detects a change in the position of the security keypad device, an alarm is activated or a tampering event is transmitted to the user.

Figure 1:
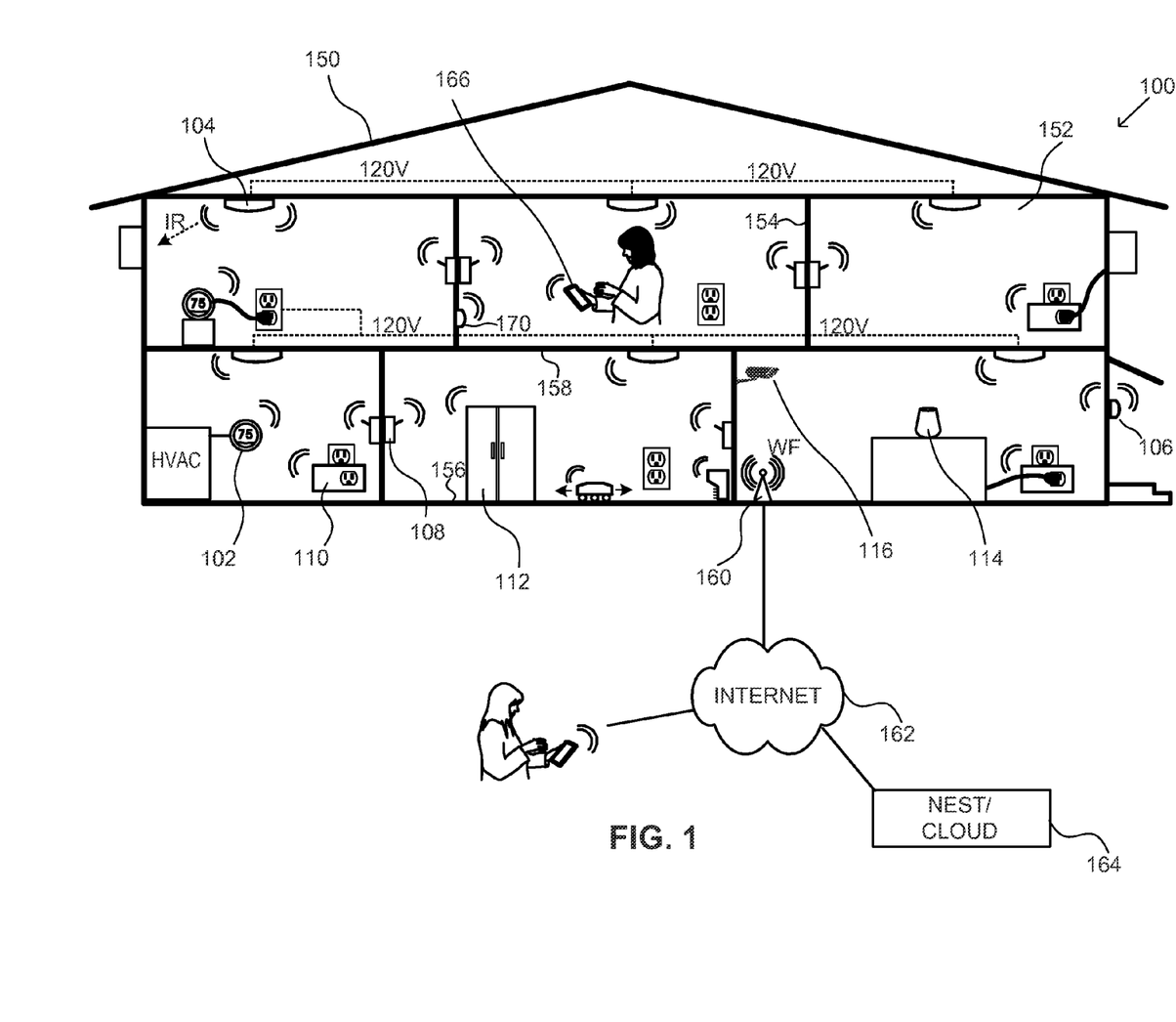
FIG. 1 is an example of a smart-home environment within which one embodiment of a system for detecting tampering of a security keypad device can be implemented.

FIG. 1 is an example of a smart-home environment 100 within which one embodiment of a system for detecting tampering of a security keypad device can be implemented. The depicted smart-home environment 100 includes an enclosure 150, which can be, e.g., a house, office building, hotel, retail store, garage, or mobile home. The system can also be implemented in a smart-home environment 100 that does not include an entire enclosure 150, such as an apartment, condominium, or office space.

The depicted enclosure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158. Further, the smart home environment can include devices outside of the actual enclosure 150, such as a pool heater or irrigation system.

The smart-home environment 100 includes a plurality of intelligent, multi-sensing, network-connected devices (hereinafter referred to as "the smart devices") that can integrate seamlessly with each other and with a computer server system 164, such as a cloud-computing system. The smart devices can include smart thermostats 102, smart hazard detectors 104, smart entryway devices 106 (e.g., doorbells or intercoms), smart wall switches 108, smart wall plug interfaces 110, and smart appliances 112, such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. The smart-home environment 100 also includes a smart security keypad 114 and a smart video camera 116.

Any of the smart devices in the smart-home environment can include any number of sensors. For example, smart appliances 112 can include sensors that detect when they are being used. Additionally, a motion or occupancy sensor, such as an ultrasonic, passive infrared (PIR), or optical sensor, can be included in any of the smart devices to detect movement and activity. Some smart devices will also have sensors specific to the device. For example, a smart light can include an ambient light sensor, such as a photoresistor or a single-pixel sensor that measures light in the room. Smart hazard detectors 104 can include smoke/fire/heat sensors, carbon monoxide/dioxide sensors, radon gas detectors, ambient light sensors, temperature sensors, humidity sensors, and the like. Any smart device can also include a processor for processing data from the sensors or other devices.

Each smart device is also equipped with communications ports or transceivers for communicating data with other smart devices. In one embodiment, the devices establish a mesh network for communication between devices. In another embodiment, the devices can connect, via a router or gateway 160, to a private network or the internet 162, including any computer server system 164 and computing device that is connected to the same network. The required data communications can be carried out using one or more of a variety of custom or standard wireless protocols (e.g., cellular, 3G/4G, Wi-Fi, ZigBee, 6LoWPAN, BLE, etc.) and/or any of a variety of custom or standard wired protocols (CAT6 Ethernet, HomePlug, etc.). One particularly useful protocol that can be used is the Thread protocol, which is promulgated by the Thread Group and based on 802.15.4, IETF IPv6, and 6LoWPAN. For some embodiments, devices that are powered by the household mains current, either directly or through an AC power adapter, can be provided with a combination of Wi-Fi, which can be relatively power-intensive, along with one or more lower-power protocols such as Thread and/or BLE. In contrast, devices that are power-constrained in that they are not powered by the household mains current and do not have access to a high-capacity battery source are provided only with one or more low-power protocols such as Thread and/or BLE. In some cases, devices that are not powered by the household mains current, but do have access to a reasonably high-capacity battery source, can be provided with a combination of Wi-Fi and one or more lower-power protocols such as Thread and/or BLE, with the Wi-Fi communications being controlled to be temporally restricted, such as being turned on only during brief periodic time intervals (e.g., once per day to upload logs and receive updates from the cloud), during particular device-sensed events, or when the user has physically actuated the device such as by pressing a button on the device.

By virtue of network connectivity, one or more of the smart devices can further allow a user to interact with the device even if the user is not proximate to the device. For example, a user can communicate with a device using a computer (e.g., a desktop computer) or mobile device (e.g., a smartphone, laptop computer, or tablet) 166. A webpage or native mobile app can be configured to receive input from the user and control the device based on the input. The webpage or mobile app can also present information about the device's operation to the user. For example, the user can view the status of a smart hazard detector or a history of notifications generated by the smart hazard detector. The user can be in the enclosure during this remote communication or outside the enclosure.

In particular, smart security keypad 114 includes one or more AIR position sensors and an accelerometer sensor. Security keypad 114 is a detached device that is not mounted to the enclosure 150 and can be located anywhere in the home. In this embodiment, security keypad 114 is located by the front entrance of the home so that the sensors can detect people coming in to the home. This location also allows a user to quickly reach the keypad and enter the code after entering the home. Security keypad 114 can be disguised to look like other objects that are commonly found in a home, such as decorative or ornamental pieces. In this embodiment, the casing that contains the various components of security keypad 116 is shaped to resemble a vase or candle holder. The casing disguises security keypad 114 from intruders that are not familiar with the device.

Video camera 116 includes an image sensor for capturing image frames and is aimed at security keypad 114. In one embodiment, video camera 116 can detect a change in the positioning of objects that are in the viewing area. For example, the processor of video camera 116 can be configured to compare two image frames captured at different points in time to detect position changes. If video camera 116 detects a change in the position of security keypad 114, a short video clip, such as 30 seconds, of the position change recording is transmitted to computer server system 164. The user can then view the clip from a computer or mobile device. Security keypad 114 and video camera 116 can also upload text logs to computer server system 164, which can then be accessed by users.

According to embodiments, the smart keypad 114, video camera 116, or other smart devices in the home are capable of assigning user-defined gestures to actions or sets of actions. For example, the user can program the smart keypad 114 with a panic gesture that causes the smart keypad 114, other devices in the smart home, or the computer server system 164 to notify authorities, such as by calling or otherwise notifying a medical or police emergency response unit. Such a panic gesture can be, for example, the user quickly waving his or her hands in the air. The user can also program the smart keypad 114 or other smart devices in the home with an audible panic command. For example, when the user yells "help", then the medical or police emergency response unit can be called or otherwise notified. In other examples, the smart keypad 114 can include a panic button that the user can press to call the police or medical emergency response unit.

Figure 2:
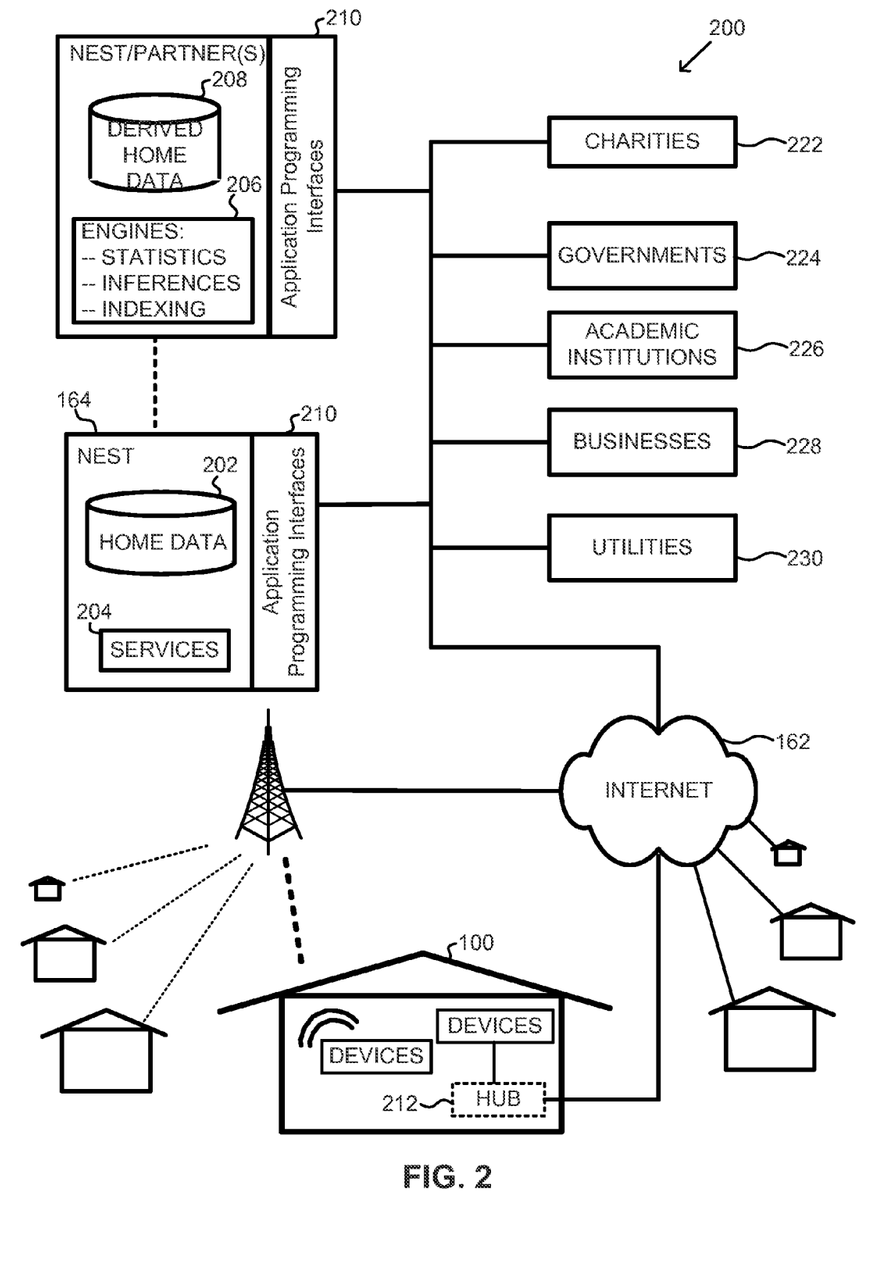
FIG. 2 is a network-level view of one embodiment of a system for detecting tampering of a security keypad device.

FIG. 2 is a network-level view of one embodiment of a system 200 for detecting tampering of a security keypad device. System 200 includes computer server system 164. Smart devices can communicate with the computer server system 164 via a private network or the internet 162. Smart devices can transmit home data 202, including user data and user activity data, to computer server system 164 for processing or storage. More specifically, home data 202 can include power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, video recording data, smart devices' log data, etc.

The computer server system 164 can further provide one or more services 204. The services 204 can include security monitoring, software updates, customer support, sensor data collection/logging, remote access, remote or distributed control, or use suggestions (e.g., based on collected home data 202 to improve performance, reduce utility cost, etc.). To facilitate these services, users can register the smart devices in their home or enclosure with the computer server system 164. Computer server system 164 can associate the smart devices with an account during the registration process. The account can be user specific or specific to a home or enclosure that includes multiple users, and a unique identification of each smart device can be stored in the account. In one embodiment, the user's mobile device or other computing device can also be associated with the account during registration. In another embodiment, one or more username and password is associated with the account during registration. The user can then use the username and password to login on the mobile or computing device, and computer server system 164 can use the account to authorize the user's mobile or computing device for the services 204. Data associated with the services 204, such as account data, can be stored at the computer server system 164.

System 200 includes a processing engine 206, which can be concentrated at a single server or distributed among several different computing entities without limitation. A single server can also include multiple engines for performing different processing tasks. The processing engine 206 can receive data from smart devices, index and store the data, or process the data to generate customized notifications or statistics. The processed data can be stored as derived home data 208. Results of the processing can be transmitted back to the device that provided the home data, to other devices, to a server providing a webpage to a user of the device, or to other non-device entities. For example, intrusion and tampering notifications can be generated by the processing engine 206 and transmitted to a user device via the Internet 162. In this manner, the processing engine 206 can be configured and programmed to derive a variety of useful information from the home data 202.

In some embodiments, to encourage innovation and research and to increase products and services available to users, system 200 provides application programming interfaces (APIs) 210 to third parties, such as charities 222, governmental entities 224 (e.g., emergency response units such as a fire department or police department, the Food and Drug Administration, or the Environmental Protection Agency), academic institutions 226 (e.g., university researchers), businesses 228 (e.g., security or fire monitoring service providers, social network providers, device warranty or equipment service providers, or providers of targeted advertisements based on home data), utility companies 230, and other third parties. The APIs 210 permit third-party systems to communicate with the computer server system 164, providing access to the services 204, the processing engine 206, the home data 202, and the derived home data 208. This allows third-party applications to submit specific data processing tasks to the computer server system 164 and receive dynamic updates to the home data 202 and the derived home data 208. For example, a police department or security monitoring service provider can develop applications using the APIs 210 to provide emergency response services to users.

In other embodiments, the services 204 can utilize third-party APIs to communicate with third-party applications. For example, if intrusion or tampering is detected, a customized notification can be transmitted to an emergency response system, such as one provided by a police department, using an API of the emergency response system. Third-party APIs can also be used to collect user data from third-parties. For example, an API of a social network provider can be utilized to gather user data for a user.

Figure 3:
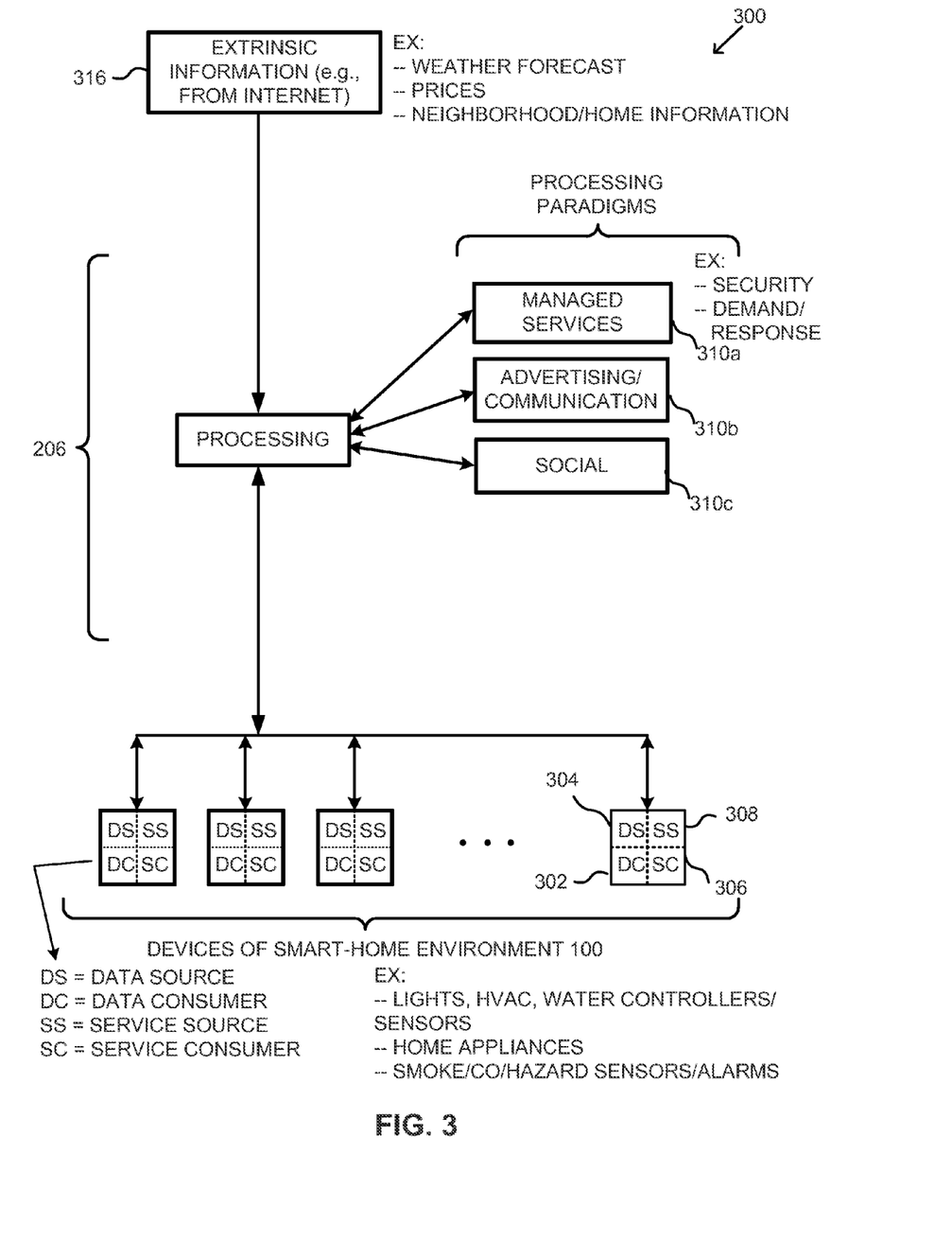
FIG. 3 is an abstracted functional view of one embodiment of a system for detecting tampering of a security keypad device.

FIG. 3 is an abstracted functional view of one embodiment of a system 300 for detecting tampering of a security keypad device. Smart devices, such as those of the smart-home environment 100 of FIG. 1, share common characteristics in that each smart device is a data consumer 302 (DC), a data source 304 (DS), a services consumer 306 (SC), and a services source 308 (SS). System 300 can be configured to harness the large amount of data generated by the smart devices to provide a variety of automated, extensible, flexible, and/or scalable technologies for achieving useful objectives. These objectives may be predefined or adaptively identified based on, e.g., user activity data or user input.

System 300 includes processing engine 206, which further includes a number of paradigms 310. Processing engine 206 can include a managed services paradigm 310a that monitors and manages device functions, such as ensuring proper operation of a device, responding to emergency situations, or detecting failure of equipment coupled to the device (e.g., a burned out light bulb). Processing engine 206 can further include an advertising/communication paradigm 310b that identifies characteristics (e.g., demographic information) of a user or products of interest to a user based on device usage. Processing engine 206 can further include a social paradigm 310c that collects data from and transmits data to a social network. For example, a user's status as reported on the social network can be collected and processed to determine user activity.

The processing engine 206 can also utilize extrinsic information 316 with the processing paradigms. Extrinsic information 316 can be used to interpret data received from a smart device, to determine a characteristic of the environment near the smart device (e.g., outside an enclosure that contains the smart device), to determine services or products available to the user, to identify a social network or social-network information, to determine contact information of entities (e.g., public service entities such as an emergency response team, the police or a hospital) near the smart device, or to identify statistical or environmental conditions, trends or other information associated with a home or neighborhood.

Figure 4:
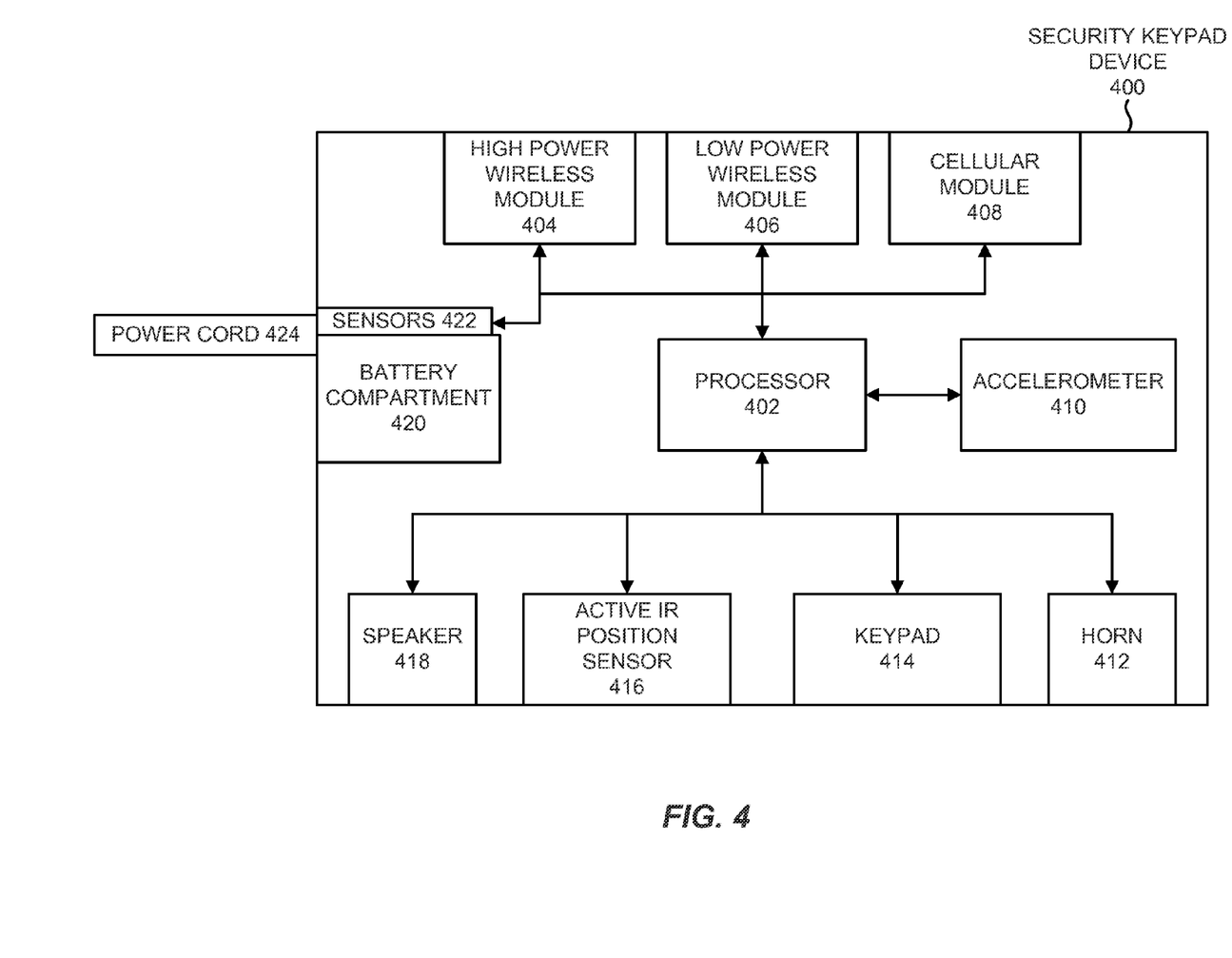
FIG. 4 is a block diagram of an embodiment of a security keypad device for detecting tampering.

FIG. 4 is a block diagram of an embodiment of a security keypad device 400 for detecting tampering. Security keypad device 400 includes a processor 402, a high power wireless module 404, a low power wireless module 406, a cellular module 408, an accelerometer 410, a horn 412, a keypad 414, an AIR position sensor 416, a speaker 418, a battery compartment 420, sensors 422, and a power cord 424.

Processor 402 is coupled to high power wireless module 404, low power wireless module 406, and cellular module 408 for communication with other devices and computers. In one embodiment, high power wireless module 404 establishes wireless communication with a router or gateway of a local area network using relatively high data rate, high power wireless protocols such as the IEEE 802.11 Wi-Fi protocols. The router or gateway also provides access to the internet. Processor 402 can use high power wireless module 404 to transmit data, such as tampering events or logs, to a computer server system via the internet. Processor 402 can also receive data from the computer server system via high power wireless module 404. In one embodiment, security keypad device 400 receives a notification from the computer server system when there is a power outage for an area that includes the home.

Low power wireless module 406 communicates directly with other smart devices in the home via a personal area mesh network using relatively low power and lower transmission rate wireless protocols such as the IEEE 802.15.4 protocols. Processor 402 can use low power wireless module 406 to receive data from other smart devices and sensors in the home. For example, processor 402 can receive signals via low power wireless module 406 from other smart devices in the home that detect a door opening or other types of motion indicating an intrusion. Processor 402 can also transmit signals to other smart devices using low power wireless module 406. In one embodiment, when security keypad device 400 detects tampering, processor 402 uses low power wireless module 406 to transmit signals to other smart devices that cause the other smart devices to activate audible alarms.

Cellular module 408 is used for communication with cell towers of a wide area network using mobile telecommunications technologies such as 3G or 4G. In one embodiment, cellular module 408 is used as a backup mode of communication. For example, if there is a power outage in the home or if the router is not functioning properly, cellular module 408 can be used to transmit tampering or intrusion events to the computer server system. In one embodiment, high power wireless module 404 can be used to determine if the router is functioning properly based on data that is received, or is expected but not received, from the router.

Processor 402 is also coupled to accelerometer 410 and AIR position sensor 416 to detect tampering. Accelerometer 410 measures acceleration forces that are applied to security keypad device 400. Measured acceleration forces include the gravitational force of the earth as well as other forces that are physically applied to the security keypad device 400. Readings from accelerometer 410 can include both the direction and the magnitude of the acceleration forces. Processor 402 receives readings from accelerometer 410 and can determine if there is tampering with security keypad device 400 based on the readings. In one embodiment, a threshold setting is used to determine if there is tampering so that false alarms are not reported for common events such as geological tremors. Thus, if a force greater than the threshold is applied to security keypad device 400 or if there is a change in force that is greater than the threshold, a tampering event is reported. In another embodiment, a double integral of the acceleration force over time is calculated to determine if the position of security keypad device 402 changed and a tampering event is reported only if the position changed.

AIR position sensor 416 includes one or more infrared emitting light sources and one or more infrared sensors. Infrared light emitted by the light sources is reflected back to the infrared sensors by objects or walls in the home. In one embodiment, the time that the infrared light is emitted and the time that the reflected infrared light is detected is tracked. The relative position of the security keypad device 400 can then be determined by using time-of-flight techniques. In another embodiment, the relative position of the security keypad device 400 can be determined based on the intensity of the reflected light that is detected.

In embodiments with multiple infrared light sources and multiple infrared sensors, the infrared light sources are aimed in different directions so that the emitted rays of infrared light reflect off of different objects. In one embodiment, processor 402 determines that the position of the security keypad device 400 changed if readings from the AIR position sensor 416 indicate a change in the relative positions of every object that is reflecting infrared light. On the other hand, if the readings indicate that only the relative position of one object that is reflecting infrared light has changed, it can be determined that there is only external motion and the position of the security keypad device 400 has not changed.

In another embodiment, readings from the AIR position sensor 416 can be combined with readings from the accelerometer 410. If both readings indicate a change in position, processor 402 determines that the position of the security keypad device 400 changed. If only the readings from AIR position sensor 416 indicate a change in position, processor 402 determines that the position of an external object has changed.

Keypad 414 provides an interface for users to control security keypad device 400. Keypad 414 receives input from users and transmits the input to processor 402. User input can include entering a code for deactivating the security system or entering a command for arming the security system. In one embodiment, keypad 414 is a touchscreen device that generates a graphical keypad display. When the security system is in the armed or countdown state, touchscreen keypad 414 can be turned off or used to display an image that disguises the keypad 414 or the security keypad device 400. For example, touchscreen keypad 414 can display an image that matches the casing of the security keypad device 400 so that an intruder will not recognize the device as a security keypad device. If the user needs to use the keypad 414, an inconspicuous button or area of the touchscreen can be pressed to display the keypad or other controls for the security system.

Horn 412 and speaker 418 generate audible alarms and alerts for security keypad device 400. In one embodiment, horn 412 is activated by processor 402 to generate a loud alarm sound if intrusion or tampering is detected. Speaker 418 is used to communicate non-emergency messages or notifications to the user. For example, if security keypad device 400 is moved or if an object is placed is front security keypad device 400 such that the AIR position sensor is blocked when the security system is in a quiescent state, speaker 418 can be activated to notify the user. Alternatively or in conjunction with activating the horn, the security keypad device may notify, via one or more of the cellular, high power wireless, and low power wireless communication modules, an external computing system (e.g., a remote cloud server) and/or a user's mobile device that an anomalous condition such as tampering has been detected.

Battery compartment 420 and power cord 424 provide operating power for security keypad device 400. Power cord 424 connects to a primary power source such as the main electric power line of the house. Battery compartment 420 holds a backup or secondary power source such as rechargeable batteries. In one embodiment, the components are configured such that power cord 424 must be disconnected from the security keypad device 400 in order to open the battery compartment 420. For example, a latch or button that opens the battery compartment 420 can be located in a recess where the power cord 424 connects, such that the latch or button is hidden by the power cord 424 when the power cord 424 is connected to security keypad device 400. Thus, the only way to reach the latch or button to open the battery compartment 420 is by disconnecting the power cord 424 from the security keypad device 400. In another embodiment, the battery compartment 420 can be located at the bottom surface of security keypad device 400, such that security keypad device 400 must be picked up to access the battery compartment 420. Accelerometer 410 or AIR position sensor 416 can detect that security keypad device 400 has been picked up and a tampering event is reported if security keypad device 400 is armed.

Sensors 422 include a sensor that can detect if the power cord 424 is disconnected. In one embodiment, the power cord 424 completes a circuit when it is connected to security keypad device 400 and sensors 422 can detect a break in the circuit. In another embodiment, power cord 424 includes a magnet located at the end that connects to security keypad device 400 and sensors 422 include a reed sensor or Hall effect sensor that can detect the magnet when the power cord 424 is connected. A signal is transmitted to processor 402 if sensors 422 detect that power cord 424 has been disconnected and a tampering event is reported if the security system is in the armed or countdown state.

Sensors 422 can also include a sensor that detects when the primary power source is not supplying power. If it is detected that the primary power source is not supplying power, a different signal is transmitted to processor 402 than if the power cord 424 is disconnected and processor 402 can take different actions. For example, the tampering event can be transmitted to the computer server system via high power wireless module 404 if the power cord 424 is disconnected.

On the other hand, if the primary power source is not supplying power, the tampering event can be transmitted via cellular module 408.

Figure 5:
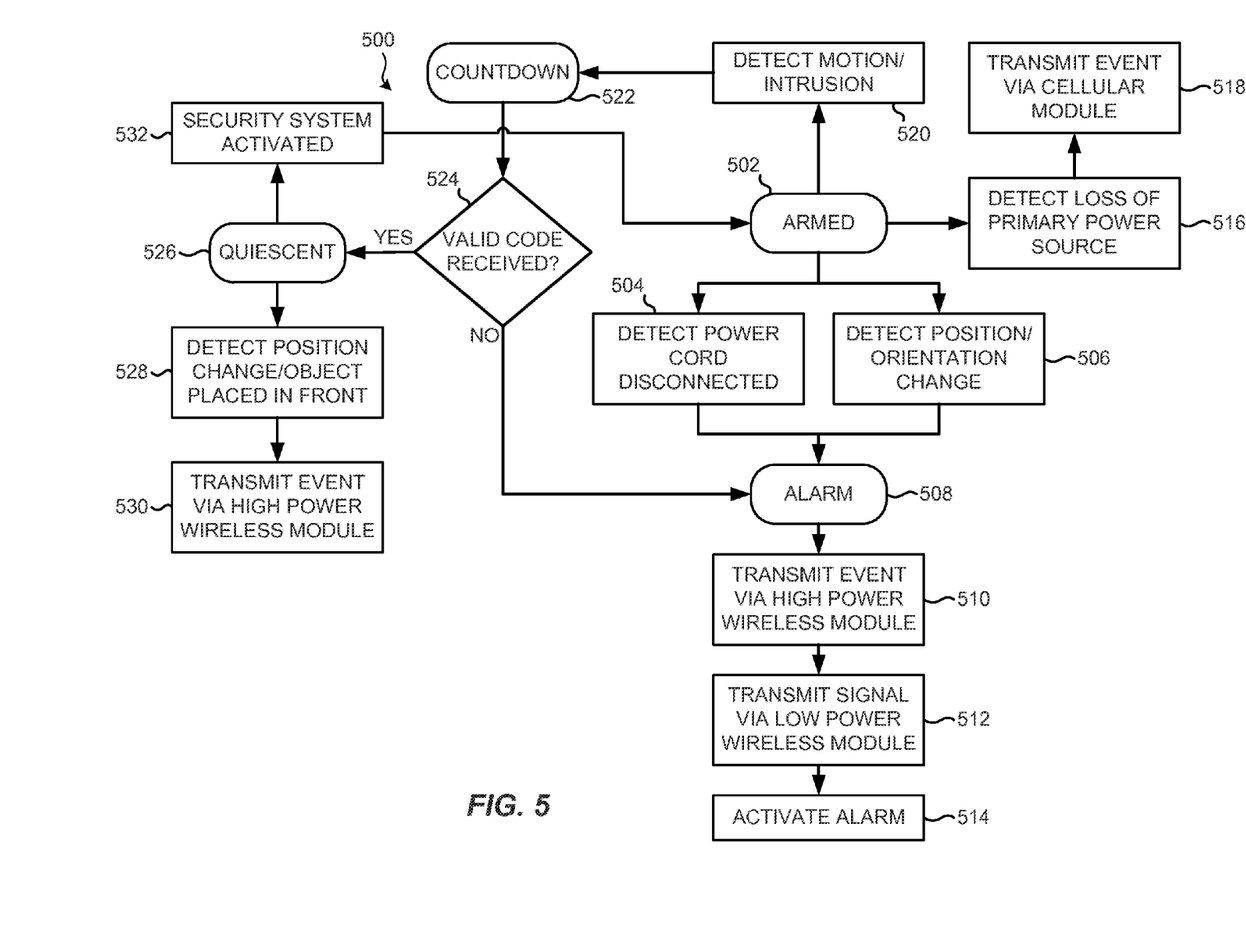
FIG. 5 is a flowchart of one embodiment of a process for detecting tampering of a security keypad device.

FIG. 5 is a flowchart of one embodiment of a process 500 for detecting tampering of a security keypad device. This process can be performed by a security keypad device such as the one illustrated in FIG. 4. In this embodiment, the security keypad device is initially in an armed state 502. If the security keypad device detects that the power cord has been disconnected (block 504) or if it is detected that the position or orientation of the security keypad device has changed (block 506), the security keypad device goes into an alarm state 508. Detection of the disconnected power cord and of the position/orientation change can be accomplished according to any of the embodiments described herein. For example, the position/orientation change of the security keypad device can be detected by another smart device, such as a video camera, and the security keypad device can go into the alarm state 508 in response to receiving a signal from the other smart device.

After going into the alarm state 508, security keypad device transmits a tampering event to a computer server system via the high power wireless module (block 510). The tampering event can then be transmitted to a user's computer or mobile device by the computer server system to notify the user of the tampering. Security keypad device also transmits a signal to other smart devices via the low power wireless module (block 512) that causes the other smart devices to activate audible alarms. At block 514, the security keypad device activates its own audible alarm by, for example, activating the horn.

Referring back to when the security keypad device is in the armed state 502, if it is detected that the primary power source is no longer supplying power (block 516), the security keypad device transmits a tampering event to the computer server system via the cellular module (block 518). In this embodiment, it is assumed that a loss of power from the primary power source indicates that an intruder has tampered with the primary power source.

In other embodiments, security keypad device can further distinguish between a power outage that affects an entire area and a loss of power that only affects the home or enclosure. For example, after detecting the loss of power from the primary power source at block 516, the security keypad device can wait for a preset period of time for a notification from the computer server system indicating that there was a power outage. The notification can be received via the cellular module and can be a short message service (SMS) text message or some other form of data indicating the power outage. If the notification is received before the period of time has elapsed, the security keypad device goes back to the armed state 502. If the notification is not received before the period of time has elapsed, the tampering event is transmitted at block 518. In further embodiments, the security keypad device can also activate the audible alarm and transmit signals to other smart devices to activate audible alarms if the notification is not received.

If motion or intrusion is detected (block 520) while the security keypad device is in the armed state 502, the security keypad device goes into a countdown state 522. Motion or intrusion can be detected by the security keypad device, e.g., by the AIR position sensor. Motion or intrusion can also be detected by other smart devices, e.g., door and window sensors or video cameras, that transmit a signal to the security keypad device.

In the countdown state 522, the security keypad device provides a preset period of time for the user to enter the code. If a valid code is received at block 524 before the period of time has elapsed, the security keypad device goes into a quiescent state 526. If a valid code is not received at block 524 before the preset period of time has elapsed, the security keypad device goes into the alarm state 508 and blocks 510, 512, and 514 are performed. In another embodiment, if any tampering is detected while the security keypad device is in the countdown state 522, e.g., power cord disconnected or position/orientation of the security keypad device changed, the security keypad device will immediately go into the alarm state 508 and blocks 510, 512, and 514 are performed.

While the security keypad device is in the quiescent state 526, if it is detected that the position of the security keypad device changed or an object has been placed in front of the security keypad device (block 528), a tampering event is transmitted to the computer server system via the high power wireless module (block 530). Thus, if a user accidentally placed an object in front of the security keypad device that blocks the AIR position sensor or if a guest of the home tries to reposition the security keypad device to neutralize the AIR position sensor, the user will be notified. In one embodiment, the tampering event indicates whether the security keypad device has been repositioned or an object has been placed in front of the security keypad device. In another embodiment, a speaker of the security keypad device can also be activated to notify the user. The speaker can audibly announce that the security keypad device has been repositioned or that an object has been placed in front of the security keypad device.

If a user activates the security system (block 532) while the security keypad device is in the quiescent state 526, the security keypad device goes into the armed state 502. The security system can be activated, for example, by a user pressing a button on the keypad or using an application executed on a mobile device. In another embodiment, the security keypad device or other smart devices can detect when all users have left the home or enclosure and the security keypad device automatically activates the security system.

Figure 6:
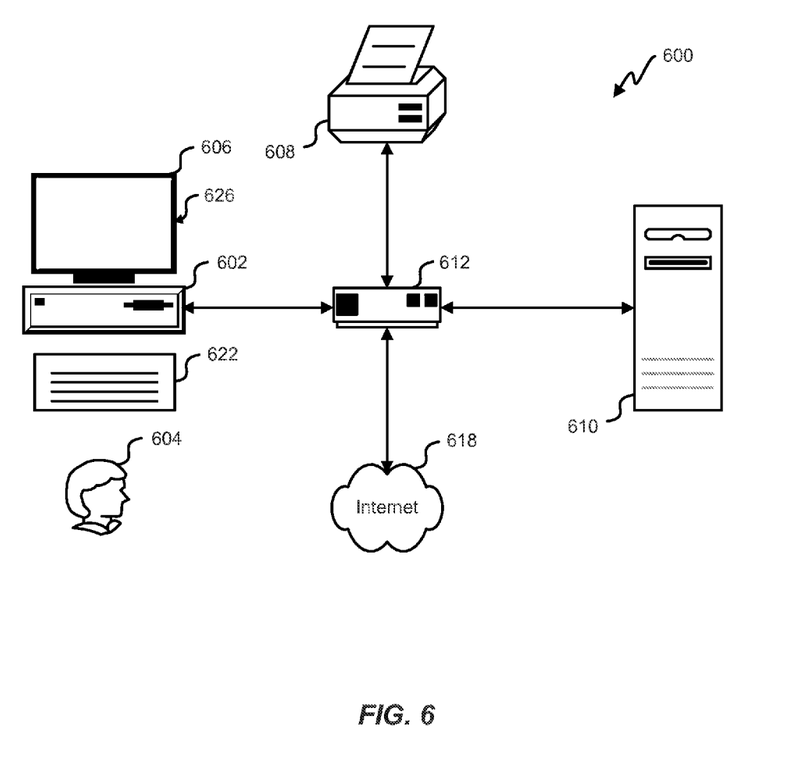
FIG. 6 is a block diagram of an exemplary environment for implementing one embodiment of a system for detecting tampering of a security keypad device.

FIG. 6 is a block diagram of an exemplary environment for implementing one embodiment of a system for detecting tampering of a security keypad device. The exemplary environment includes a computer system 600 that can be used by a user 604 to remotely control, for example, one or more of the smart devices according to one or more of the embodiments described herein. The computer system 600 can alternatively be used for carrying out one or more of the server-based processing described herein above or as a processing device in a larger distributed computer server system for carrying out processing. The computer system 600 can include a computer 602, keyboard 622, a network router 612, a printer 608, and a monitor 606. The monitor 606, processor 602 and keyboard 622 are part of a computer system 626, which can be a laptop computer, desktop computer, handheld computer, mainframe computer, etc. The monitor 606 can be a CRT, flat screen, etc.

A user 604 can input commands into the computer 602 using various input devices, such as a mouse, keyboard 622, track ball, touch screen, etc. If the computer system 600 comprises a mainframe, a designer 604 can access the computer 602 using, for example, a terminal or terminal interface. Additionally, the computer system 626 may be connected to a printer 608 and a server 610 using a network router 612, which may connect to the Internet 618 or a WAN.

While only one server 610 is shown in the figure, it is understood that computer system 626 can be connected to any number of servers.

The server 610 may be used to store additional software programs and data. In one embodiment, software implementing the systems and methods described herein can be stored on a storage medium in the server 610. Thus, the software can be run from the storage medium in the server 610. In another embodiment, software implementing the systems and methods described herein can be stored on a storage medium in the computer 602. Thus, the software can be run from the storage medium in the computer system 626. Therefore, in this embodiment, the software can be used whether or not computer 602 is connected to network router 612. Printer 608 may be connected directly to computer 602, in which case, the computer system 626 can print whether or not it is connected to network router 612.

Figure 7:
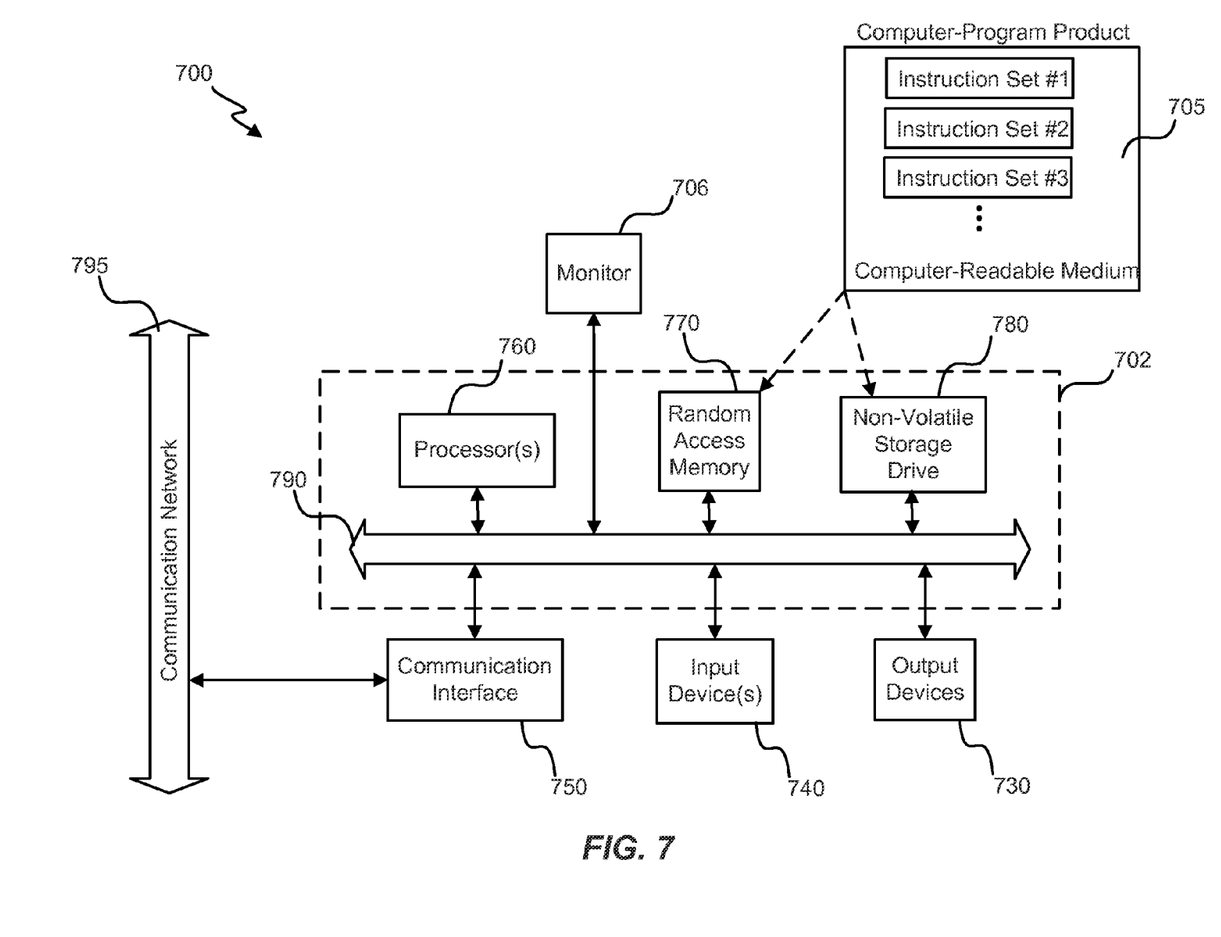
FIG. 7 is a block diagram of an embodiment of a special-purpose computer system for detecting tampering of a security keypad device.

FIG. 7 is a block diagram of an embodiment of a special-purpose computer system 700 for detecting tampering of a security keypad device. The methods and systems described herein may be implemented by computer-program products that direct a computer system to perform the actions of the methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof.

Special-purpose computer system 700 comprises a computer 702, a monitor 706 coupled to computer 702, one or more additional user output devices 730 (optional) coupled to computer 702, one or more user input devices 740 (e.g., keyboard, mouse, track ball, touch screen) coupled to computer 702, an optional communications interface 750 coupled to computer 702, a computer-program product 705 stored in a tangible computer-readable memory in computer 702. Computer-program product 705 directs system 700 to perform the above-described methods. Computer 702 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-transitory storage drive 780 (e.g., disk drive, optical drive, solid state drive), which are forms of tangible computer-readable memory.

Computer-program product 705 may be stored in non-transitory storage drive 780 or another computer-readable medium accessible to computer 702 and loaded into memory 770. Each processor 760 may comprise a microprocessor, such as a microprocessor from Intel® or Advanced Micro Devices, Inc.®, or the like. To support computer-program product 705, the computer 702 runs an operating system that handles the communications of product 705 with the above-noted components, as well as the communications between the above-noted components in support of the computer-program product 705. Exemplary operating systems include Windows® or the like from Microsoft Corporation, Solaris® from Sun Microsystems, LINUX, UNIX, and the like.

User input devices 740 include all possible types of devices and mechanisms to input information to computer system 702. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 706 via a command such as a click of a button or the like. User output devices 730 include all possible types of devices and mechanisms to output information from computer 702. These may include a display (e.g., monitor 706), printers, non-visual displays such as audio output devices, etc.

Communications interface 750 provides an interface to other communication networks and devices and may serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB®, interface, a wireless network adapter, and the like. For example, communications interface 750 may be coupled to a computer network, to a FireWire® bus, or the like. In other embodiments, communications interface 750 may be physically integrated on the motherboard of computer 702, and/or may be a software program, or the like.

RAM 770 and non-transitory storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-transitory storage drive 780 may be configured to store the basic programming and data constructs that provide the functionality of various embodiments of the present invention, as described above.

Software instruction sets that provide the functionality of the present invention may be stored in RAM 770 and non-transitory storage drive 780. These instruction sets or code may be executed by the processor(s) 760. RAM 770 and non-transitory storage drive 780 may also provide a repository to store data and data structures used in accordance with the present invention. RAM 770 and non-transitory storage drive 780 may include a number of memories including a main random access memory (RAM) to store instructions and data during program execution and a read-only memory (ROM) in which fixed instructions are stored. RAM 770 and non-transitory storage drive 780 may include a file storage subsystem providing persistent (non-transitory) storage of program and/or data files. RAM 770 and non-transitory storage drive 780 may also include removable storage systems, such as removable flash memory.

Bus subsystem 790 provides a mechanism to allow the various components and subsystems of computer 702 to communicate with each other as intended. Although bus subsystem 790 is shown schematically as a single bus, alternative embodiments of the bus subsystem may utilize multiple busses or communication paths within the computer 702.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for detecting tampering of a security keypad device, the system comprising:
   the security keypad device comprising:
      a keypad,
      a high power wireless module configured to transmit and receive data wirelessly via a local area network,
      a low power wireless module configured to transmit and receive data wirelessly at a lower rate of data transfer than the high power wireless module, and further configured to consume less power than the high power wireless module,
      a cellular module configured to transmit and receive data wirelessly via a wide area network,
      a power cord configured to transfer power to the security keypad device from a primary power source,
      wherein the security keypad device is configured to remain moveably detached from a home in which the security keypad device is located;
      a battery compartment configured to hold a secondary power source,
      an active infrared (IR) position sensor including a light source configured to emit IR light and an IR sensor configured to detect reflected IR light of objects or walls within the home, the active IR position sensor being incorporated as part of the security keypad device and configured to determine a position of the security keypad device within the home based on measuring a time-of-flight of the reflected IR light,
      an accelerometer configured to measure an acceleration force, and
      a processor configured to:
         receive positional data from the active IR position sensor,
         receive acceleration data from the accelerometer,
         determine that the position of the security keypad device changed based on the positional data, and
         transmit a tampering event to a computer server system in response to determining that the position of the security keypad device changed, the tampering event indicating that the security keypad device has been physically tampered with; and
   the computer server system being communicatively coupled to the security keypad device and configured to:
      receive the tampering event, and
      transmit the tampering event to a mobile device that is authorized to access an account associated with the security keypad device.

2. The system of claim 1, further comprising:
   a video camera aimed at an area that includes the security keypad device, the video camera being configured to detect a change in image between a first image frame and a second image frame, and transmit a second tampering event to the computer server system.

3. The system of claim 2, wherein the video camera is further configured to transmit a video recording to the computer server system, the video recording including the first image frame and the second image frame.

4. The system of claim 2, wherein at least one of the security keypad device and the video camera is configured to detect a panic gesture of a user.

5. The system of claim 1, further comprising:
   an electronic device communicatively coupled to the security keypad device and configured to:
      determine that a heartbeat signal has not been received from the security keypad device after a time interval since receiving a previous heartbeat signal, and
      transmit a second tampering event to the computer server system in response to determining that the heartbeat signal has not been received.

6. The system of claim 5, wherein the electronic device comprises at least one of a thermostat, a hazard detector, and a video camera.

7. The system of claim 5, wherein the processor of the security keypad device is further configured to transmit a tampering signal to the electronic device via the low power wireless module, and the electronic device is further configured to activate an audible alarm in response to receiving the tampering signal.

8. The system of claim 1, wherein the processor of the security keypad device is further configured to:
  determine that an object has been placed in front of the security keypad device while the security keypad device is in a quiescent state, and
  transmit a second tampering event to the computer server system in response to determining that the object has been placed in front of the security keypad device.

9. The system of claim 8, wherein the processor of the security keypad device determines that the object has been placed in front of the security keypad device by determining that the positional data indicates that the position changed and that the acceleration data does not indicate that the position changed.

10. The system of claim 1, wherein the security keypad device further includes a sensor configured to detect that the security keypad device is not receiving power from the primary power source, and wherein the processor of the security keypad device is further configured to transmit a second tampering event via the cellular module in response to receiving a signal from the sensor indicating that the security keypad device is not receiving power from the primary power source.

11. A security keypad device for detecting tampering, the security keypad device comprising:
  a keypad, wherein the security keypad device is configured to remain moveably detached from a home in which the security keypad device is to be located;
  a high power wireless module configured to transmit and receive data wirelessly via a local area network;
  a low power wireless module configured to transmit and receive data wirelessly via a personal area network at a lower rate of data transfer than the high power wireless module, and further configured to consume less power than the high power wireless module;
  a cellular module configured to transmit and receive data wirelessly via a wide area network;
  a horn configured to generate an audible alarm;
  an active infrared (IR) position sensor including a light source configured to emit IR light and an IR sensor configured to detect reflected IR light within the home, the active IR position sensor being incorporated as part of the security keypad device and configured to determine a relative position of the security keypad device within the home based on measuring a time-of-flight of the reflected IR light, the relative position being relative to an external object;
  an accelerometer configured to measure an acceleration force; and
  a processor configured to:
    receive positional data from the active IR position sensor,
    receive acceleration data from the accelerometer,
    determine that a position of the security keypad device changed based on the positional data, and
    activate the horn in response to determining that the position of the security keypad device changed.

12. The security keypad device of claim 11, further comprising:
  a power cord configured to transfer power to the security keypad device from a primary power source;
  a sensor configured to detect that the power cord is disconnected; and
  a battery compartment configured to hold a secondary power source,
  wherein the power cord must be disconnected from the security keypad device in order to open the battery compartment, and
  wherein the processor is further configured to activate the horn in response to receiving a signal from the sensor indicating the power cord is disconnected.

13. The security keypad device of claim 11, wherein the acceleration force is a gravitational force of an earth, and wherein the processor is further configured to determine that a direction of the acceleration force changed based on the acceleration data, and activate the horn in response to determining that the direction changed.

14. The security keypad device of claim 11, wherein the processor is further configured to:
  receive user input via the keypad, the user input indicating a code,
  determine that the code is valid,
  place the security keypad device into a quiescent state in response to determining that the code is valid,
  determining that the position of the security keypad device changed while the security keypad device is in the quiescent state, and
  not activating the horn in response to determining that the position of the security keypad device changed while the security keypad device is in the quiescent state.

15. The security keypad device of claim 14, further comprising:
  a speaker configured to generate an audible alert at a lower volume than the horn,
  wherein the processor is further configured to activate the speaker in response to determining that the position of the security keypad device changed while the security keypad device is in the quiescent state.

16. The security keypad device of claim 15, wherein the audible alert generated by the speaker is audible speech indicating that the position of the security keypad device changed.

17. The security keypad device of claim 11, wherein the keypad is a touchscreen keypad.

18. The security keypad device of claim 17, wherein the processor is further configured to disguise the touchscreen keypad when the security keypad device is in an armed state.

19. A security keypad device for detecting tampering, the security keypad device comprising:
  means for receiving user input of a code;
  means for communicating data wirelessly via a local area network at a relatively high rate of data transfer that consumes a relatively high amount of power;
  means for communicating data wirelessly at a relatively low rate of data transfer that consumes a relatively low amount of power;
  means for communicating data wirelessly via a wide area network;
  means for emitting infrared (IR) light;
  means for detecting reflected IR light reflected off objects or walls within a home;
  means for sensing a position of the security keypad device based on detecting the reflected IR light and measuring a time-of-flight of the reflected IR light, wherein the security keypad device is configured to remain moveably detached from the home in which the security keypad device is located;
  means for determining that the position of the security keypad device changed based on the sensed position; and means for generating an audible alarm in response to determining that the position of the security keypad device changed.

20. The security keypad device of claim 19, further comprising:
means for disguising the security keypad device.

* * * * *